Jan. 13, 1931.  R. BERINGER  1,788,367
OVER GEAR TRANSMISSION
Filed Oct. 27, 1926  2 Sheets-Sheet 2

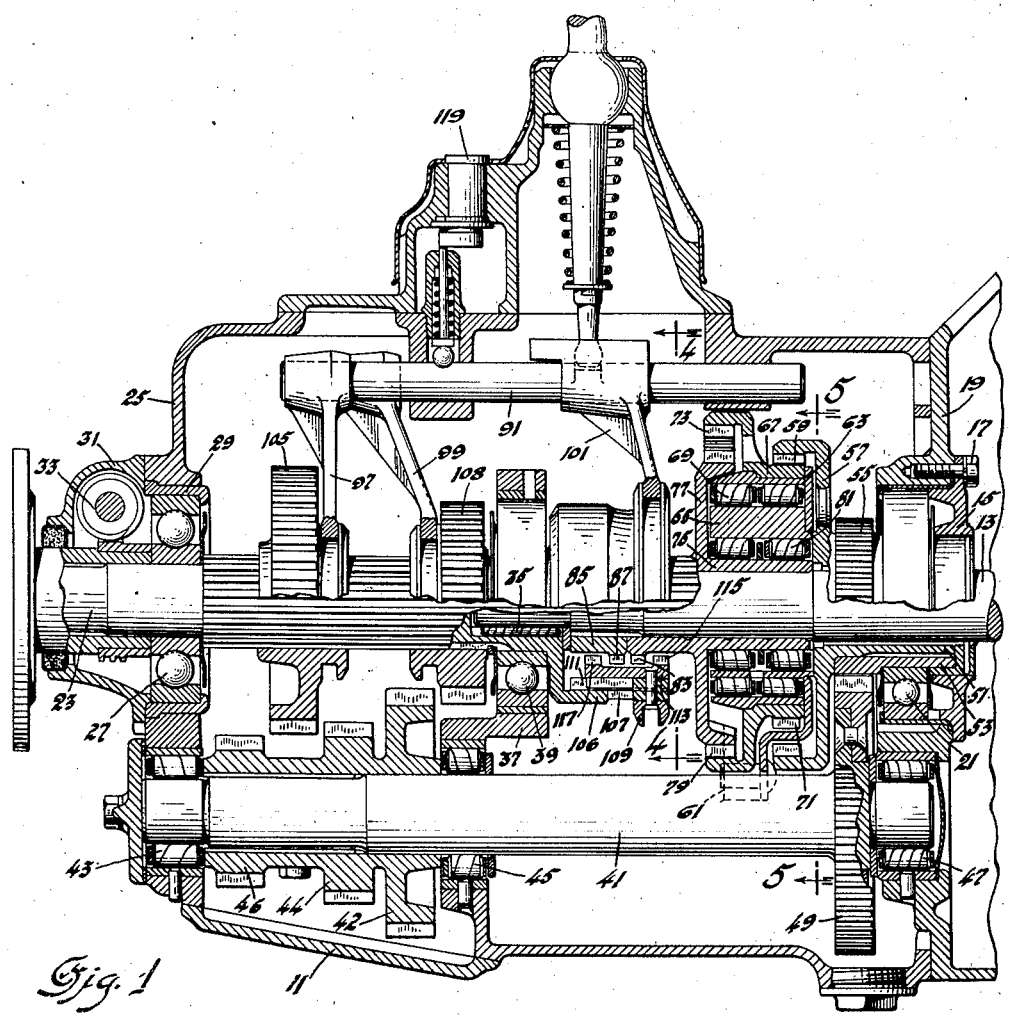

Inventor
Roscoe Beringer
By Blackmore, Spencer & Hill
Attorneys

Patented Jan. 13, 1931

1,788,367

UNITED STATES PATENT OFFICE

ROSCOE BERINGER, OF DETROIT, MICHIGAN

OVERGEAR TRANSMISSION

Application filed October 27, 1926. Serial No. 144,472.

This invention relates to transmission gearing and has been developed as an improved transmission device for motor vehicles.

It is well-known that in motor vehicles the engine is capable of driving the vehicle on level roads with less gearing reduction than is provided between the propeller shaft and the rear axle. However, it has not been considered desirable to employ a ring gear and pinion having a higher ratio, lest in the case of moderately hilly roads and city driving it should become necessary to use the intermediate gearing, which, in the case of the usual spur gear train is noisy and, therefore, objectionable. It has been proposed to overcome this difficulty by arranging an additional gear train within the gear box capable of speeding the transmission shaft above the clutch shaft. The use of this over-gear will permit the car to be driven at a higher rate of speed or, and what is perhaps a better statement of its use, to permit a lower engine speed for a given rate of travel, thus economizing in fuel and oil and enabling the engine to operate more efficiently. This over-gear is to be used under those circumstances where the engine is capable of driving the car with less reduction than is afforded by the ring gear and pinion.

This invention involves such a system of gearing and aims to provide an over-gear wherein the gear shifting is readily made and wherein the over-drive is comparatively noiseless. As a further object the invention aims to so arrange the gearing that it shall be compact, shall not involve material lengthening of the transmission casing, and wherein the over-gear mechanism is adequately supported.

The inventive idea may be embodied in several forms as shown on the accompanying drawing. In this drawing:

Figure 1 is a longitudinal section through a transmission housing showing one embodiment of the invention.

Figure 2 is a plan view of the shifting rods.

Figure 3 is a diagram to show the movements of the shift lever.

Figure 4:
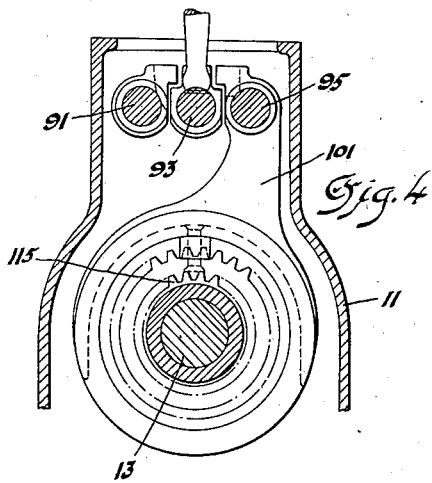
Figure 4 is a section on line 4—4 of Figure 1.
Figure 5:
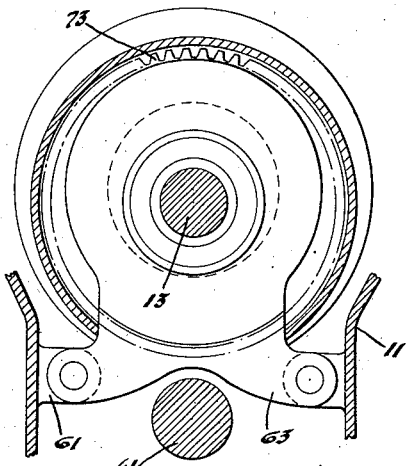
Figure 5 is a section on line 5—5 of Figure 1.

Referring first to Figures 1 to 5, inclusive, numeral 11 represents the transmission housing. From the vehicle clutch (not shown) a shaft 13 enters the housing 11 and passes through a closure plate 15 held by fastening means 17, the said closure plate cooperating with the wall 19 to retain a shaft bearing 21. Shaft 23 is the transmission shaft to be driven at the same or different rates of speed from shaft 13. Transmission shaft 23 extends through the rear end wall 25 of the housing 11 where one end is rotatably mounted in ball bearing 27, the wall 25 having mounted therein a flanged ring 29 engaging the bearings and held in position by a supplemental housing 31 serving to inclose the gearing 33 for the speedometer. Shafts 13 and 23 are in alignment, the former being reduced at its end and telescoped in the adjacent end of shaft 23, roller bearings 35 being interposed between the shaft ends. To support the inner adjacent ends of shafts 13 and 23 casing 11 is provided with a web 37 in which is carried anti-friction means 39 rotatably supporting shaft 23 and shaft 13 telescoped therein.

As in the usual arrangement of vehicles the transmission housing is provided with countershafts for reduced speed and reverse driving. The drawing shows countershaft 41 mounted in bearings 43, 45 and 47 at its ends and central portion. Countershaft 41 has secured thereto a gear member having three integral spur gears 42, 44 and 46 to function as the intermediate, low and reverse drive, respectively. Gear 46 is to engage the idler gear, not shown, as usual for reverse drive. Countershaft 41 is equipped at its front end with a relative large gear 49 whereby it is driven from the clutch shaft 13.

Shaft 13 entering the housing 11 is provided just within the bearing 21 with a rigid inner hub 51. Upon hub 51 is keyed an outer hub 53. Hub 51 extends inwardly beyond hub 53, as shown. Hub 53 is formed with teeth 55 to engage gear 49, whereby the countershaft 41 is constantly driven. Hub 51 is formed with a cup-shaped flange 57 having internal gear teeth 59.

Cast integrally with the housing 11 are two lugs 61, one on each side. Secured to these lugs is a bracket 63 arched over the countershaft 41. This bracket encircles the clutch shaft 13. The bracket 63 carries a sleeve 65 having an exterior surface eccentric to shaft 13. Around this sleeve 65 is mounted a ring gear 67, two annular sets of roller bearings 69 serving as an anti-friction support. The ring gear 67 carries at one edge external teeth 71 meshing in one position (shown at the top) with the internal gear teeth 59 of the flange 57. At its other edge ring gear 67 is of a large diameter and carries interior teeth 73.

Rotatable about shaft 13 is a hub 75. It has a flange 77 formed with external teeth engaging at one position (as shown at 79 of Figure 1) with the internal teeth 73 of the ring gear 67. Roller bearings 81 may be used around the hub 75 and within the eccentric sleeve 65. The inner end of hub 75 carries external driving clutch teeth 83. It will be understood from the above description that hub 75 (with clutch teeth 83) is rotating at a speed above that of the driving shaft 13 and is positioned concentrically therewith, the over-speed being had by means of the eccentric internal gearing, which is, of course, a comparatively silent drive.

Keyed to the shaft 13 is a clutch member 85 having teeth 87 which, if engaged by a driven member, will obviously constitute a direct drive. Engagement of means carried by driven shaft 23 with hub 75 or gear 85 will thus serve to secure the over-speed or the direct drive as the case may be. Engagement of means carried by driven shaft 23 with gears 42, 44 or 46 will give the intermediate, low or reverse drives.

Slidably mounted for horizontal reciprocation in the upper portion of the housing 11 are three rods 91, 93 and 95, carrying shifter forks 97, 99 and 101, respectively. The outer rod 91 carrying the shifter fork 97 engages a collar on gear 105 which is thus slidable by movement of rod 91 into engagement with the idler gear, not shown for reversed drive through the connection of the idler with gear 46. Gear 105 is also engageable with gear 44 for low speed. Rod 93, by means of its fork 99, moves gear 108 into mesh with gear 42 for intermediate drive. For driving in high and over-gear the shaft 95 is employed. It makes use of a fork 101. Shaft 23 carries rigid therewith a forwardly directed spider 106 having one or more slots 107. A collar 109 slides along the spider. Within the spider and in sliding relation as at 111 is a clutch 113. This clutch has teeth 115 movable into engagement with teeth 83. It also has teeth 117 for engagement with teeth 87. The collar 109 is secured to clutch 113 by a pin passing through the slot 107. It will be seen that a movement of rod 95, such as to slide clutch 113 in a direction to engage teeth 115 and 83, gives a speed to the driven shaft which is greater than that of the clutch shaft. A movement in the reverse direction gives a direct clutch engagement between shafts 13 and 23 through the engagement of teeth 117 and 87. This is the connection made for normal, "high" driving. The drive through teeth 115 and 83 is the "over-gear" designed for use on long stretches of level roads where a given engine speed will drive the car faster, or where, for a given car speed, the engine would be running slower, with the attendant advantages in gas and oil consumption.

With this construction the slot in the middle fork through which the end of the gear shift lever passes is preferably formed with a bend 120 so as to make it easier to move in the direction of direct drive than in the direction of over-speed drive. This is shown in Figure 2. As a result it is necessary to exert a certain greater amount of lateral pressure upon the over-speed fork in moving the shift lever laterally to go into over-speed than is required in going from second to direct. The fact that this additional pressure is required makes it less likely that the driver will shift from second to over-speed inadvertently.

A lock device is shown at 119 but it is not being described in detail, as it is not a part of this invention. It might also be added that any suitable interlock between the shift rods may be used, no interlock being shown as the interlock is no part of this invention.

Figure 6:
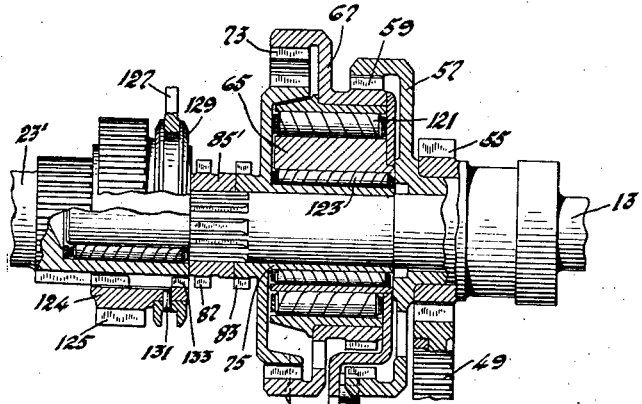
Figure 6 is a longitudinal section through a part of the gearing of a modified form.

In Figure 6 is shown another form of the invention, this being a form having a progressive shift. As before, teeth 55 on shaft 13 drive the countershaft through gear 49. Flange 57, by means of its teeth 59, drives the ring gear mounted eccentrically as before, and the ring gear 67 drives the hub 75 by means of the engaging teeth 73. The hub 75 has clutch teeth 83 as before. One difference to be noted is that in this form a single roller bearing 121 is employed in place of the two series of bearings 69 in the form previously described. Also single roller bearings 123 are substituted for the bearings 81 of the form first described. Adjacent the end of hub 75 is a clutch member 85' keyed to shaft 13 having teeth 87 spaced away from teeth 83 instead of being adjacent thereto, as shown in Figure 1. Slidably keyed to the enlarged end of driven shaft 23' is a gear 124 having external teeth 125 to engage the second speed gear on the countershaft when slidably moved by a fork 127 engaging a collar 129 pinned at 131 to said gear. Internal teeth 133 on the gear 124 may engage clutch teeth 87 or 83 to secure a direct or over-speed drive, as will be readily seen.

Figure 6 shows gear 124 in neutral position from which it may be moved toward the left to secure an intermediate drive. If moved to the right so as to engage teeth 133 and 87 the transmission shaft 23' is driven in high. A slight further movement toward the right gives a second neutral position in which teeth 133 are between teeth 87 and 83. A further movement to the right engages teeth 133 and 83 whereupon the transmission shaft is driven in overspeed. The transmission details for reverse, low and second are in other respects the same as those already described in connection with the form shown in Figure 1.

Figure 8:
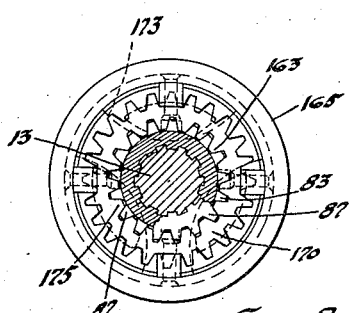
Figures 7 and 8 illustrate a third form, Figure 7 being in longitudinal section and Figure 8 being a transverse section on line 8—8 of Figure 7.
Figure 7:
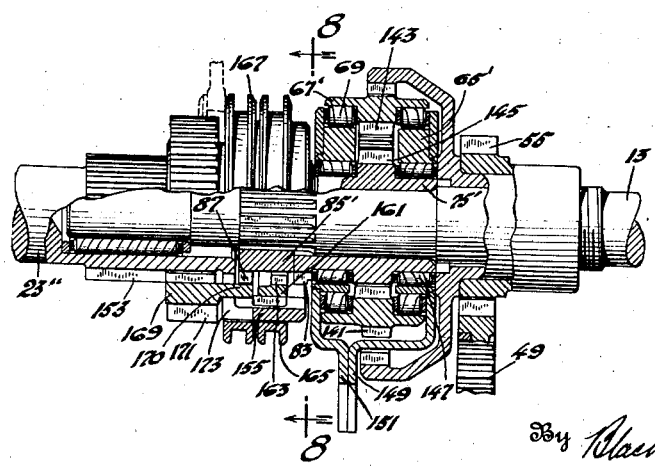

In Figures 7 and 8 there is shown another form in which the invention may be embodied. In this form the shaft 13 from the clutch drives the countershaft by gearing 55 and 49, as before. Two eccentric rings 65', are mounted in the gear housing and are surrounded by plural bearings 69, as in the form shown by Figure 1. A ring gear 67' surrounds the bearings 69. The ring gear has external teeth 141 and internal teeth 143. The teeth are intermediately positioned with reference to the bearings 69. The hub 75', rotatable around shaft 13, has central teeth 145 engaging teeth 143, there being also double bearings between the eccentric and the hub 75 as shown at 147. The double eccentric ring is shown as carried in this case, by a gear housing bracket differing slightly from the bracket 63 of the previous forms. It is double the form of two diverging parts 149 and 151 housing the over-speed internal gearing. The hub 75' has the external drive clutch teeth 83, as before, and there is the clutch member 85' keyed to the shaft 13 with teeth 87 spaced from teeth 83 as in Figure 6.

Driven shaft 23'' is enlarged and splined at 153 as in Figure 6. It is formed with a spider 155 having at its forward end internal teeth along which slides a clutch member 161 having internal teeth 163 to engage teeth 83 of the over-speed drive. The gear 161 may be connected to a collar 165 by a pin as shown in Figure 6, whereby, when the collar is moved by the shifter fork the over-speed drive may be engaged or disengaged. Also slidable on the outside of the spider is a second collar 167 connected in any convenient way (as for example, by a pin like the pin 131 in Figure 6) with the gear 169. Gear 169 has external teeth 171 for engagement with the intermediate gear of the countershaft in the usual way. At its forward end gear 169 has a plurality of segments 170 (three being preferred) passing through a similar number of slotted openings in the web of the spider as shown at 173 in Figure 7, the dotted lines in Figure 8 showing the outline of the slotted openings. The segments of gear 169 have teeth 175 for engagement with teeth 87 to secure a direct drive. It may be explained that in this case one shift fork provides for the reverse and low gear drive, as usual, a second fork makes the shift into second and into high, and that the third fork actuates the over-speed. This arrangement provides a selective system and is exceedingly compact. It secures a very uniform load distribution by the use of the bearings. The location of the second speed collar around the outside of the spider permits a reduction in the over all length of the gearing.

The disclosure of this application may be considered as an improvement over that of my application Ser. No. 72,334, filed Nov. 30, 1925, for transmission with overspeed. Among the advantages attained by the structure of this improvement are the following:

The arrangements described secure a reduction in the overall length. The internal gearing is substantially radially outside the bearings, whereby a better support is provided for the internal gearing. The shafts are shortened, thus permitting a reduction in diameter and a lessening of vibration.

I claim:

1. In transmission gearing of the class described, a shaft, stationary sleeve means surrounding said shaft, said sleeve means having an inner circular wall concentric with and spaced from said shaft, and an outer circular wall eccentric relative thereto, a ring gear member around said sleeve means, anti-friction means between the outer wall of said sleeve means and the inner wall of said ring gear, a hub surrounding said shaft and located within said sleeve means, anti-friction means between said hub and said stationary sleeve means, a second alined shaft, gear trains between said ring gear and said hub, and said first mentioned shaft, respectively, and a means to clutch said second shaft to said hub or to said first mentioned shaft.

2. The invention defined by claim 1, said gear trains being axially within the planes of the end walls of said stationary sleeve means.

In testimony whereof I affix my signature.

ROSCOE BERINGER.